United States Patent
Nemoto

(10) Patent No.: US 6,693,986 B2
(45) Date of Patent: Feb. 17, 2004

(54) SIGNAL CONTROL APPARATUS, TRANSMISSION SYSTEM AND SIGNAL RESYNCHRONIZATION CONTROL METHOD

(75) Inventor: Nobuyuki Nemoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 629 days.

(21) Appl. No.: 09/736,840

(22) Filed: Dec. 14, 2000

(65) Prior Publication Data

US 2001/0017894 A1 Aug. 30, 2001

(30) Foreign Application Priority Data

Feb. 28, 2000 (JP) .......... 2000-055917

(51) Int. Cl.$^7$ .......... H04L 25/36; H04L 25/40; H04L 7/00
(52) U.S. Cl. .......... 375/372; 375/371; 370/516
(58) Field of Search .......... 375/371, 372, 375/373; 370/516, 517, 907; 327/153, 161; 710/58, 59, 61

(56) References Cited

U.S. PATENT DOCUMENTS

| | | | |
|---|---|---|---|
| 4,780,844 A | * 10/1988 | Keller | 710/58 |
| 5,185,863 A | * 2/1993 | Hamstra et al. | 710/61 |
| 5,598,443 A | * 1/1997 | Poeppleman | 375/359 |
| 5,636,254 A | * 6/1997 | Hase et al. | 375/371 |
| 6,400,785 B1 | * 6/2002 | Sunaga et al. | 375/372 |
| 6,512,804 B1 | * 1/2003 | Johnson et al. | 375/372 |

FOREIGN PATENT DOCUMENTS

| | | |
|---|---|---|
| JP | 05075561 | 3/1993 |
| JP | 08037521 | 2/1996 |
| JP | 08124376 | 5/1996 |
| JP | 081139711 | 5/1996 |

* cited by examiner

Primary Examiner—Phoung Phu
(74) Attorney, Agent, or Firm—Katten Muchin Zavis Rosenman

(57) ABSTRACT

Disclosed are a signal control apparatus, a transmission system and a signal resynchronization control method, which efficiently prevent the occurrence of slipping and execute high-quality signal resynchronization control. The signal control apparatus comprises a serial/parallel converting section, a window setting section and a parallel/serial converting section. The serial/parallel converting section performs serial/parallel conversion on an input signal to yield parallel data. The window setting section sets a small window having a readout guarantee area narrowed at an optimal position at the time of reading the parallel data when an operational state is unstable, and sets a large window having the readout guarantee area widened from the optimal position when the operational state is stable. The parallel/serial converting section reads the parallel data based on a read pulse positioned within the readout guarantee area corresponding to the small window or the large window, and performs parallel/serial conversion on the parallel data to yield serial data. The transmission system comprises a plurality of transmission apparatuses each including the above signal control apparatus, and a transmission medium for connecting the transmission apparatuses. The signal resynchronization control method executes signal resynchronization control by performing the functions of the individual sections of the signal control apparatus.

15 Claims, 11 Drawing Sheets

SIGNAL CONTROL APPARATUS, TRANSMISSION SYSTEM AND SIGNAL RESYNCHRONIZATION CONTROL METHOD

BACKGROUND OF THE INVENTION

1. Field of the Invention

The present invention relates to a signal control apparatus, a transmission system and a signal resynchronization control method, and, more particularly, to a signal control apparatus which controls digital signals, a transmission system which transmits digital signals over a network, such as SONET (Synchronous Optical Network) or SDH (Synchronous Digital Hierarchy), and a signal resynchronization control method which controls resynchronization of signals, such as a clock.

2. Description of the Related Art

Network synchronous transmission systems, such as SONET of North America and SDH used in general foreign countries, have become the mainstream of the recent multiplex communications technology. Transmission apparatuses on those systems perform clock resynchronization control in order to, for example, suppress jittering of clocks and establish bit phase synchronization.

FIG. 10 is a diagram showing the outline of conventional clock resynchronization control. A serial/parallel converting section 101 performs serial/parallel conversion to convert a serial input clock signal to a parallel signal based on a write clock.

A window setting section 201 performs parallel/serial conversion to convert a parallel signal to a serial signal based on a read clock.

The serial/parallel conversion of an input clock signal increases the phase margin, and bits are identified in this state to thereby suppress jittering. The parallel/serial conversion is then performed to convert the resultant parallel signal back to a serial signal to thereby establish bit phase synchronization. Through this processing, the input clock signal that is synchronous with the frequency of the write clock is resynchronized with the frequency of the read clock.

If the phase of the read pulse varies, however, this conventional clock resynchronization control should undesirably read the same data twice or would suffer data slipping.

FIG. 11 is a diagram illustrating the problem of the conventional clock resynchronization control. When a read pulse is located within a window W1 (a "L" portion) which is generated from a write clock, parallel data A can be read out. The window W1 guarantees reading over a range of 1 to 7 in terms of the number of memory stages, and the memory stage numbers 0, 8 and 9 are slip areas.

When the read pulse is positioned approximately at the center of the window W1 as in the case of a read pulse R1 in the diagram, stable reading is possible.

If the phase of the read pulse varies and the read pulse is fixed at either end of the window W1 as in the case of read pulses R2 and R3, however, further phase shifting is likely to cause data slipping.

Network synchronous transmission systems should construct a highly reliable digital network by repressing such data slipping and provide stable clock frequencies.

SUMMARY OF THE INVENTION

Accordingly, it is an object of the present invention to provide a signal control apparatus which efficiently prevents the occurrence of data slipping and executes high-quality signal resynchronization control.

It is another object of this invention to provide a transmission system which efficiently prevents the occurrence of data slipping and executes high-quality signal resynchronization control before transmitting signals.

It is a further object of this invention to provide a signal resynchronization control method which efficiently prevents the occurrence of data slipping and executes high-quality signal resynchronization control.

To achieve the above objects, according to one aspect of this invention, there is provided a signal control apparatus for controlling digital signals, which comprises a serial/parallel converting section for performing serial/parallel conversion on an input signal to yield parallel data; a window setting section for setting a small window having a readout guarantee area narrowed at an optimal position at a time of reading the parallel data when an operational state is unstable, and setting a large window having the readout guarantee area widened from the optimal position when the operational state is stable; and a parallel/serial converting section for reading the parallel data based on a read pulse positioned within the readout guarantee area corresponding to the small window or the large window, and performing parallel/serial conversion on the parallel data to yield serial data.

According to another aspect of this invention, there is provided a transmission system for transmitting digital signals over a network, which comprises a plurality of transmission apparatuses each including the signal control apparatus of the first aspect; and a transmission medium for connecting the transmission apparatuses.

According to a further aspect of this invention, there is provided a signal resynchronization control method for executing signal resynchronization control, which comprises the steps of performing serial/parallel conversion on an input signal to yield parallel data; setting a small window having a readout guarantee area narrowed at an optimal position at a time of reading the parallel data when an operational state is unstable; setting a large window having the readout guarantee area widened from the optimal position when the operational state is stable; and reading the parallel data based on a read pulse positioned within the readout guarantee area corresponding to the small window or the large window, and performing parallel/serial conversion on the parallel data to yield serial data.

The above and other objects, features and advantages of the present invention will become apparent from the following description, when taken in conjunction with the accompanying drawings which illustrate preferred embodiments of the present invention by way of example.

DESCRIPTION OF THE PREFERRED EMBODIMENTS

Figure 1:
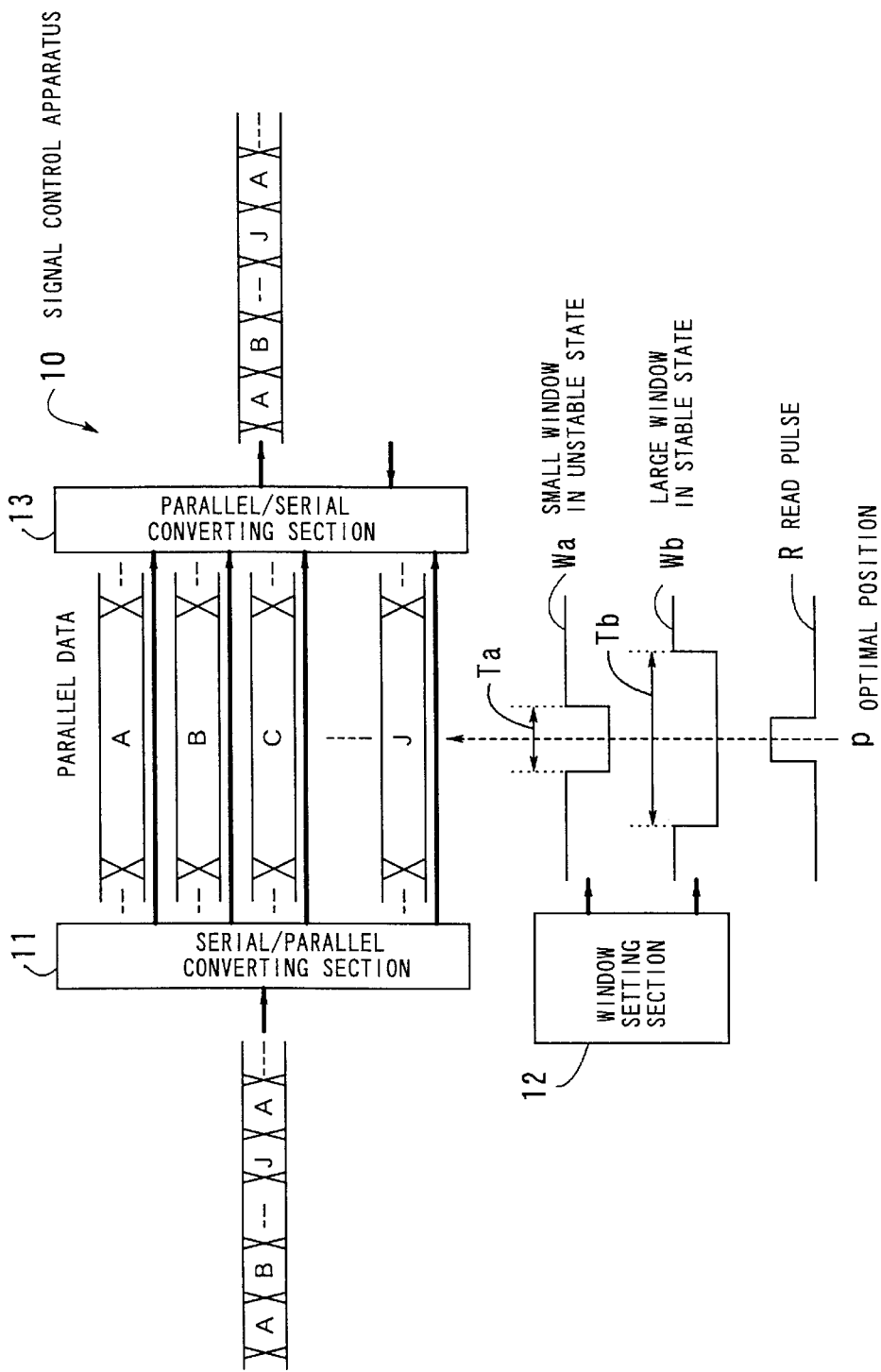
FIG. 1 is a diagram illustrating the principles of a signal control apparatus according to the present invention.

Preferred embodiments of the present invention will now be described with reference to the accompanying drawings. FIG. 1 is a diagram illustrating the principles of a signal control apparatus according to this invention. A signal control apparatus 10, which executes signal resynchronization control on digital signals (e.g., clock signals), is provided in a transmission apparatus or the like which performs communications over SONET, SDH or the like. Such transmission apparatuses are connected to one another by a transmission medium, such as an optical fiber cable, thereby constructing a transmission system.

A serial/parallel converting section 11 performs serial/parallel conversion on an input signal at a serial/parallel ratio of, for example, 1:10 to thereby convert a serial input signal to parallel data.

A window setting section 12 sets a small window Wa having a readout guarantee area narrowed at an optimal position (near the center of parallel data) p at the time of reading the parallel data when the operational state (which indicates the state or the like of a variation in frequency or phase) is unstable. The "L" portion of the small window Wa is a readout guarantee area Ta.

When the operational state is stable, the window setting section 12 sets a large window Wb having the readout guarantee area widened from the optimal position p. The "L" portion of the large window Wb is a readout guarantee area Tb.

The parallel/serial converting section 13 reads parallel data based on a read pulse R positioned within the readout guarantee area Ta of the small window Wa or the readout guarantee area Tb of the large window Wb, and performs parallel/serial conversion on the parallel data at a parallel/serial ratio of, for example, 10:1 to produce serial data.

Figure 2:
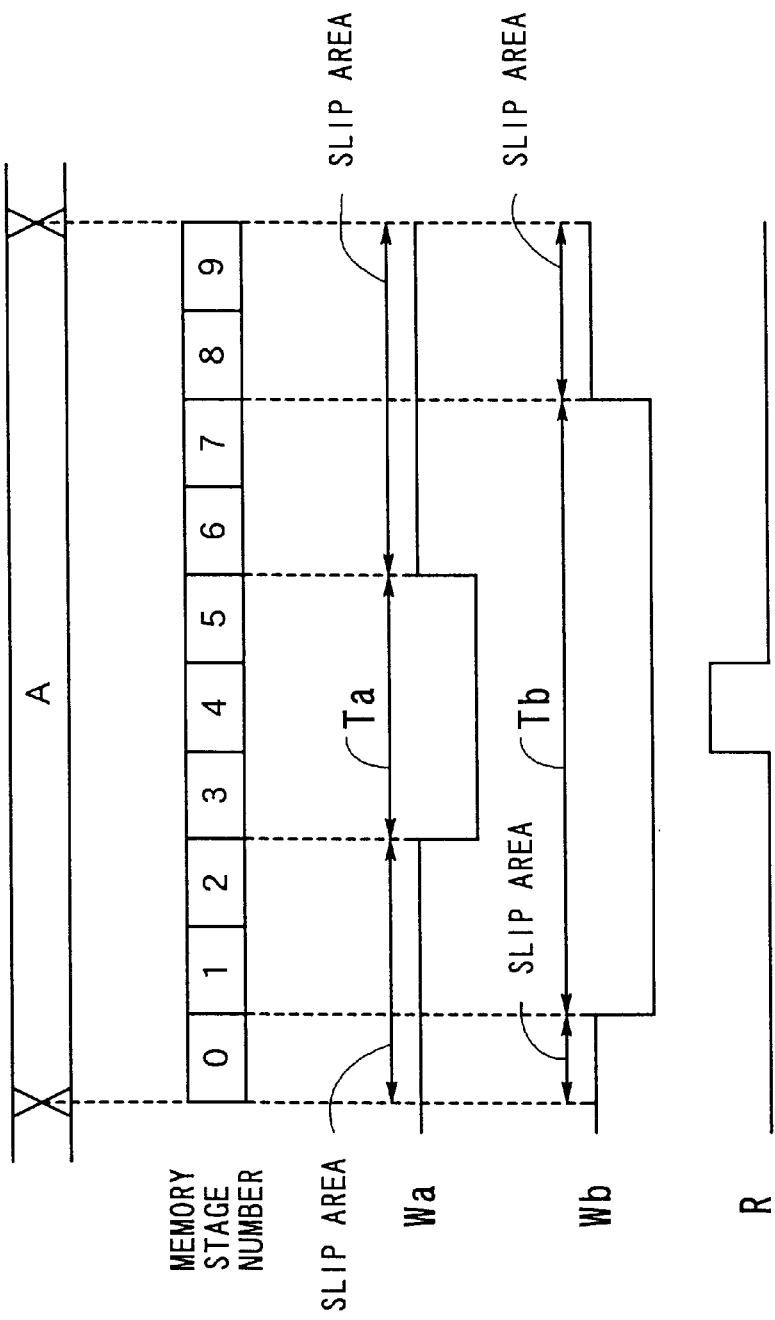
FIG. 2 is a diagram for explaining how to set windows.

The following will specifically discuss how to set the windows. FIG. 2 is a diagram for explaining how to set the windows. The window setting section 12 can set a window in two ways.

The operational state is unstable in a given period from the initialized state at the time the apparatus is powered on or reset because there is a frequency change or the like in this period. In such a period, the small window Wa is set.

The illustrated small window Wa guarantees data reading in a range of 3 to 5 in terms of the number of memory stages. The memory stage numbers 0 to 2 and 6 to 9 are set as slip areas. The small window Wa whose parallel-data readout guarantee area Ta is narrowed at near the center of parallel data (in the vicinity of the center memory stage number) is set in such an unstable state.

When the given period passes and the operational state enters a stable state, the window is changed to the large window Wb. The illustrated large window Wb guarantees data reading in a range of 1 to 7 in terms of the memory stage number. The memory stage numbers 0, 8 and 9 are set as slip areas. The large window Wb whose parallel-data readout guarantee area Tb is widened from near the center of parallel data (near the center memory stage number) is set in such a stable state.

The read pulse R is synchronous with the small window Wa and the large window Wb. In an unstable period such as the initialized state, the read pulse R is positioned within the readout guarantee area Ta of the small window Wa. In the subsequent stable, the read pulse R is positioned within the readout guarantee area Tb of the large window Wb.

As the small window Wa in an unstable state is switched to the large window Wb in a stable state this way, the read pulse R can always be positioned near the center memory stage number.

Even when a phase shift or the like occurs during the operation of the apparatus, therefore, this window switching can allow the read pulse R to be shifted from the center memory stage number by that phase shift. This can suppress undesirable shifting of the read pulse R to the slip area, thus ensuring stable synchronization control.

Figure 3:
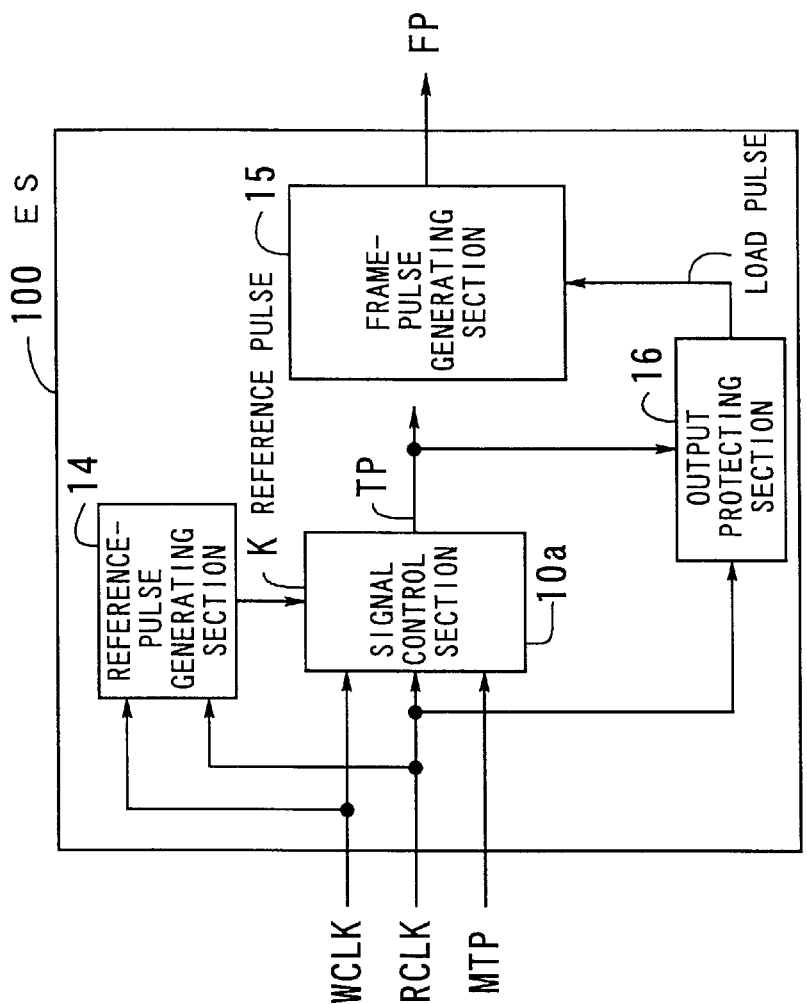
FIG. 3 is a diagram showing an elastic store.

A description will now be given of an elastic store to which the signal control apparatus 10 of this invention is adapted. FIG. 3 is a diagram showing an elastic store.

An elastic store (hereinafter abbreviated to "ES") 100 comprises a signal control section 10a which has the functions of the individual sections discussed above, a reference-pulse generating section 14, a frame-pulse generating section 15 and an output protecting section 16. The ES 100 perform serial/parallel conversion and parallel/serial conversion to execute signal resynchronization control. In FIG. 3, the ES 100 generates a frame pulse FP from an input master timing pulse MTP and outputs the frame pulse FP.

The signal control section 10a writes the master timing pulse MTP or the input signal in response to a write clock WCLK. The signal control section 10a reads the master timing pulse MTP in response to a read clock RCLK, thus generating a timing pulse TP.

The reference-pulse generating section 14 receives the write clock WCLK and the read clock RCLK and generates a reference pulse K which is needed to generate the small window Wa and large window Wb that are synchronous with the aforementioned read pulse R. The details of the function of this reference-pulse generating section 14 will be given later with reference to FIGS. 4 and 5.

The frame-pulse generating section 15 generates the frame pulse FP based on the timing pulse TP and outputs the frame pulse FP.

The output protecting section 16 receives the read clock RCLK and the timing pulse TP and monitors if the timing pulse TP is generated in a normal period.

When receiving the timing pulse TP of an abnormal period even once, the output protecting section 16 does not judge that it is receiving the timing pulse TP of the normal period unless it thereafter receives the timing pulses TP of the normal period for a preset number of protection stages.

When the output protecting section 16 receives the timing pulses TP of the normal period for the number of protection stages, the output protecting section 16 sends a load pulse to the frame-pulse generating section 15.

When the number of protection stages is not met, the output protecting section 16 stops sending the load pulse to the frame-pulse generating section 15 and instructs the frame-pulse generating section 15 to carry out self-oriented control. An example of the operation of the output protecting section 16 will be discussed later referring to FIG. 8.

Figure 4:
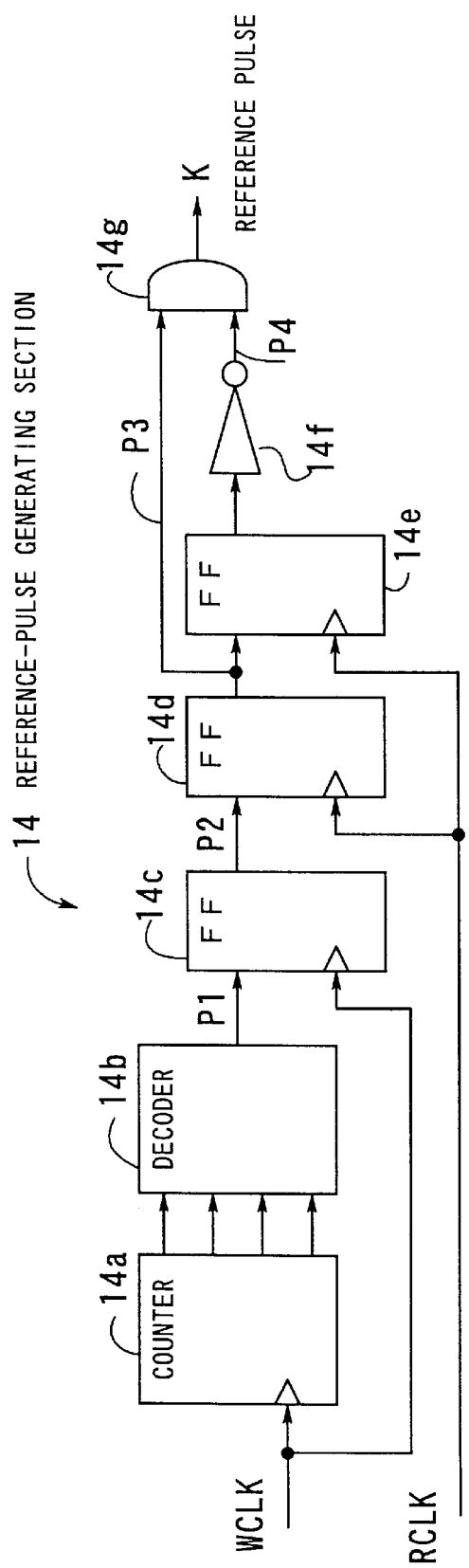
FIG. 4 is a diagram showing the structure of a reference-pulse generating section.

The generation of the reference pulse K will now be discussed. FIG. 4 is a diagram showing the structure of the reference-pulse generating section 14. The reference-pulse generating section 14 has a counter 14a to whose clock terminal the write clock WCLK is input. As the counter 14a has ten memory stages, it has a 4-bit output. This 4-bit output is input to a decoder 14b and is decoded there. The decoder 14b outputs a decoded pulse P1.

A flip-flop 14c latches the decoded pulse P1 when receiving the write clock WCLK at its clock terminal and outputs a pulse P2. A flip-flop 14d latches the pulse P2 when receiving the read clock RCLK at its clock terminal and outputs a pulse P3. A flip-flop 14e latches the pulse P3 when receiving the read clock RCLK at its clock terminal.

The output of the flip-flop 14e is inverted by an inverter 14f. An AND element 14g obtains a logical product of the output of the inverter 14f and the pulse P3, and sends out the logical product as the reference pulse K.

Figure 5:
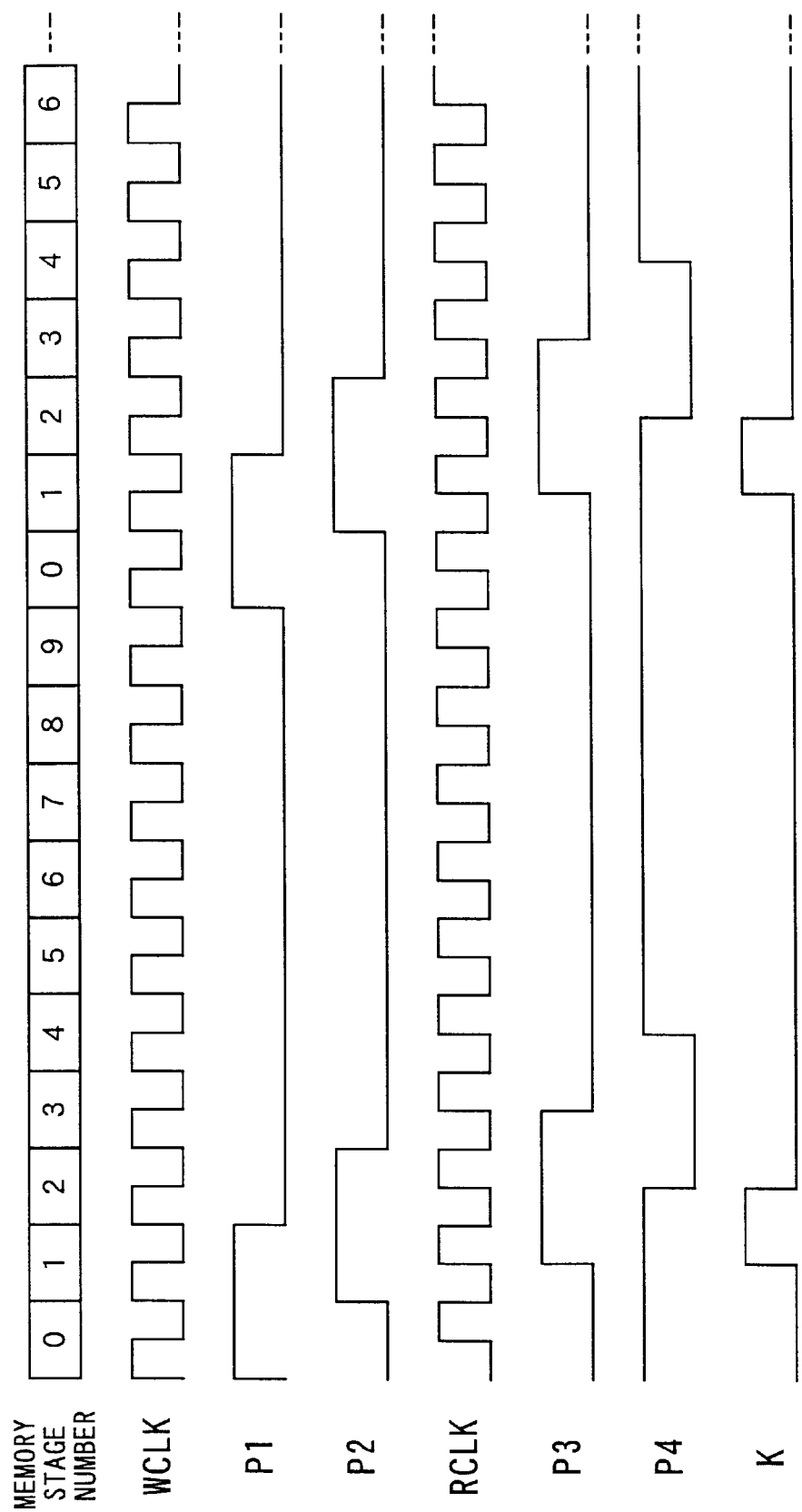
FIG. 5 is a timing chart illustrating individual waveforms from the reference-pulse generating section.

FIG. 5 is a timing chart illustrating individual waveforms from the reference-pulse generating section 14. The decoded pulse P1 is a pulse which has been decoded in such a way as to be output at the memory stage numbers 0 and 1. The pulse P2 is the decoded pulse P1 latched in response to the write clock WCLK.

The pulse P3 is the pulse P2 latched in response to the read clock RCLK. The pulse P4 is the pulse P3 latched in response to the read clock RCLK and then inverted. The reference pulse K is the logical product of the pulse P3 and the pulse P4.

Figure 6:
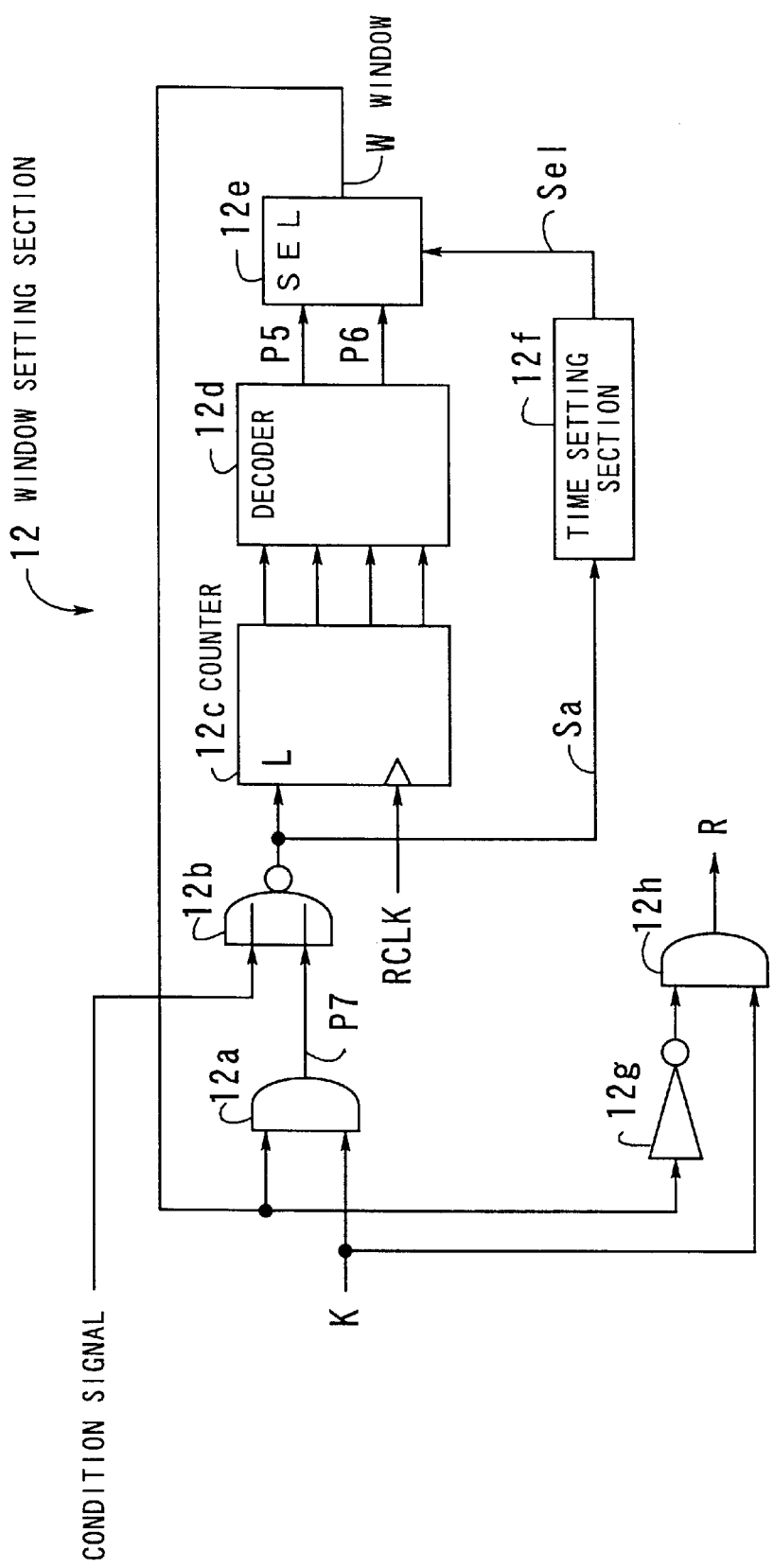
FIG. 6 is a diagram depicting the structure of a window setting section.

The window setting section 12 will now be described. FIG. 6 is a diagram depicting the structure of the window setting section 12.

The window setting section 12 has an AND element 12a obtains a logical product of a window W (either the small window Wa or the large window Wb) output from a selector 12e and the reference pulse K, and outputs a pulse P7.

A NOR element 12b performs a NOR operation on a condition signal and the pulse P7 and sends an output signal Sa to a counter 12c and a time setting section 12f. The condition signal indicates a load condition to be supplied to the counter 12c at the time a window is generated. For example, the condition signal indicates the content of power-on reset, switching between a presently used system and a reserve system, recovery of a clock, or the like.

The counter 12c outputs a 4-bit count value when receiving the read clock RCLK at its clock terminal and the output signal Sa from the NOR element 12b at its load terminal.

A decoder 12d decodes this 4-bit output and outputs a decoded pulse P5 or P6. The decoded pulse P5 corresponds to the small window Wa and the decoded pulse P6 corresponds to the large window Wb.

When receiving the enabled output signal Sa, the time setting section 12f sends a select signal Sel to the selector 12e. When the output signal Sa is received here (the condition signal has become enabled), it can be determined that the operational state is unstable. In this case, the time setting section 12f outputs the select signal Sel in such a way that the selector 12e selects the decoded pulse P5.

After a given time (e.g., 100 ms) passes, it is considered that the operational state is stable, so that the time setting section 12f outputs the select signal Sel in such a way that the selector 12e selects the decoded pulse P6.

The selector 12e selects either the decoded pulse P5 or P6 based on the select signal Sel and sends the selected pulse as the window W.

The window W is input to the AND element 12a and an inverter 12g. The inverter 12g inverts the window W. An AND element 12h acquires a logical product of the output of the inverter 12g and the reference pulse K and outputs the read pulse R.

Figure 7:
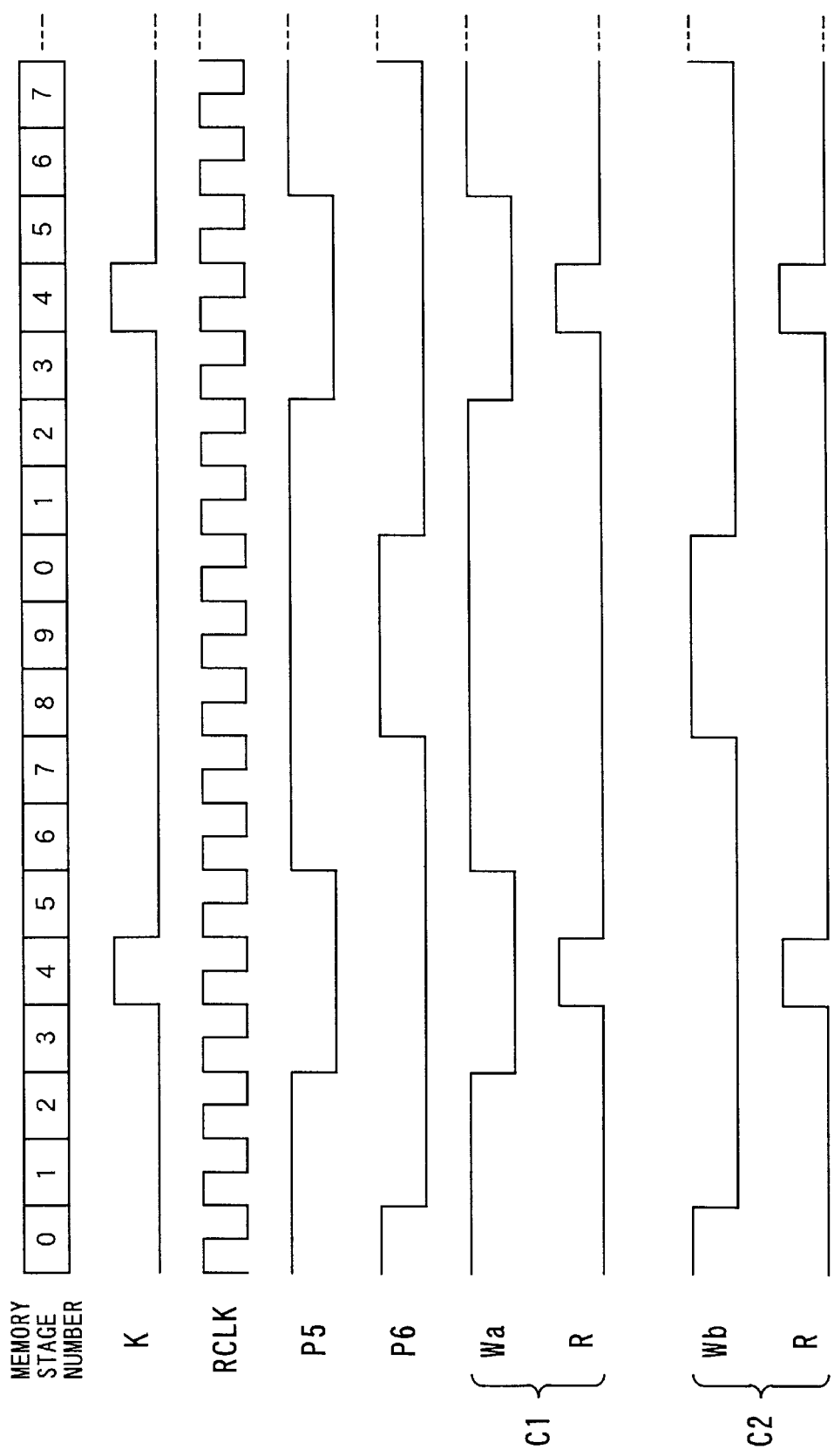
FIG. 7 is a timing chart illustrating individual waveforms from the window setting section.

FIG. 7 is a timing chart illustrating individual waveforms from the window setting section 12. The decoded pulse P5 is a pulse decoded in such a way as to be output at the memory stage numbers 1 to 7.

C1 in the timing chart indicates the phases the small window Wa in an unstable state (within 100 ms since the time setting section 12f has received the output signal Sa) and the read pulse R.

C2 in the timing chart indicates the phases the large window Wb in a stable state (after passing of 100 ms since the time setting section 12f has received the output signal Sa) and the read pulse R.

As apparent from the foregoing description, the write clock WCLK is decoded and is resynchronized with the read clock RCLK and the reference pulse K is generated from the resultant pulse.

The use of the reference pulse K, which is synchronous with the read clock RCLK, to generate the small window Wa and the large window Wb allows the small window Wa and large window Wb to be synchronous with the read pulse R, so that the read pulse R behaves bit by bit with respect to those windows.

Figure 8:
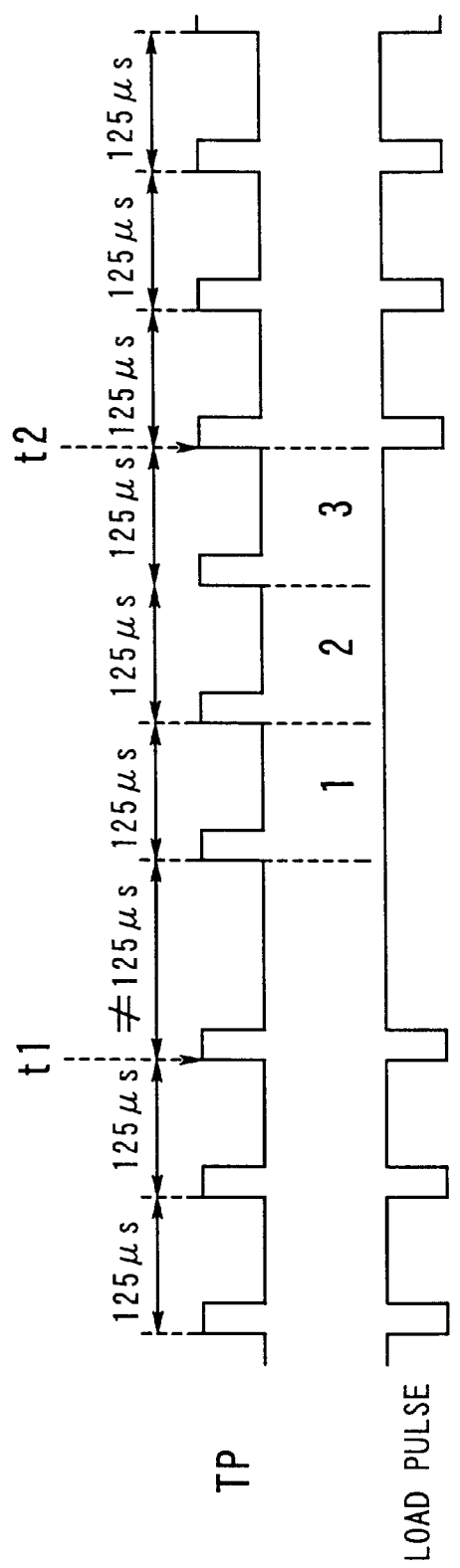
FIG. 8 is a diagram illustrating the operation of an output protecting section.

The operation of the output protecting section 16 will be discussed below. FIG. 8 is a diagram illustrating the operation of the output protecting section 16. It is assumed that the signal control section 10a outputs the timing pulse TP of 125 µs at a normal time and the number of protection stages of the output protecting section 16 is "3".

As illustrated, while the output protecting section 16 is receiving the normal timing pulse TP of 125 µs, the output protecting section 16 outputs the load pulse.

Suppose that the output protecting section 16 has received the timing pulse TP of a longer period than 125 µs at timing t1. In this case, the output protecting section 16 does not output the load pulse until it thereafter receives the normal timing pulse TP three times. During this period, the frame-pulse generating section 15 performs a self-operation and outputs a frame pulse generated under self-oriented control.

After timing t2 at which the output protecting section 16 has received the third normal timing pulse TP of 125 µs, the output protecting section 16 outputs the load pulse again.

Figure 9:
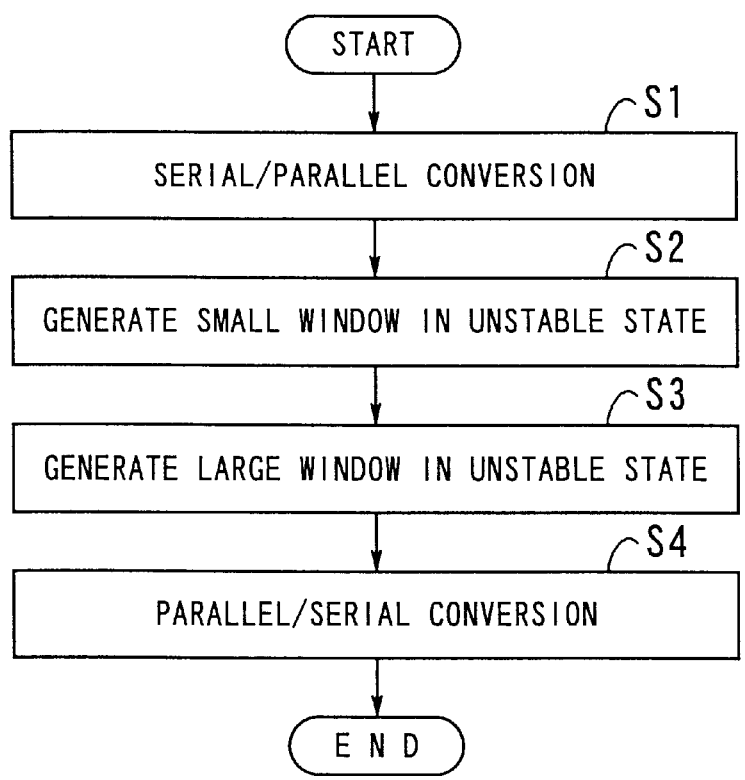
FIG. 9 is a flowchart illustrating procedures of a signal resynchronization control method according to this invention.
Figure 10:
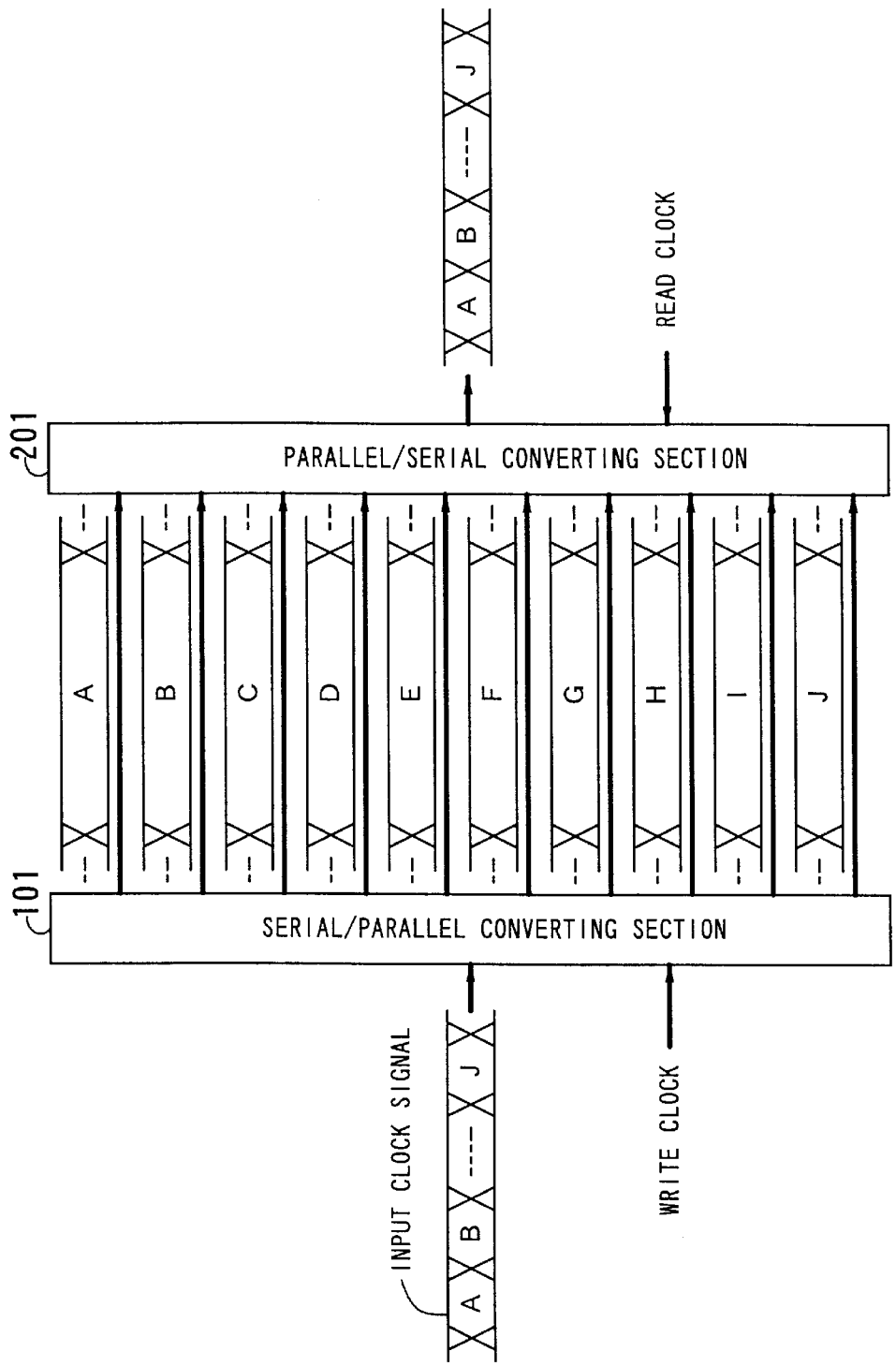
FIG. 10 is a diagram showing the outline of conventional clock resynchronization control.
Figure 11:
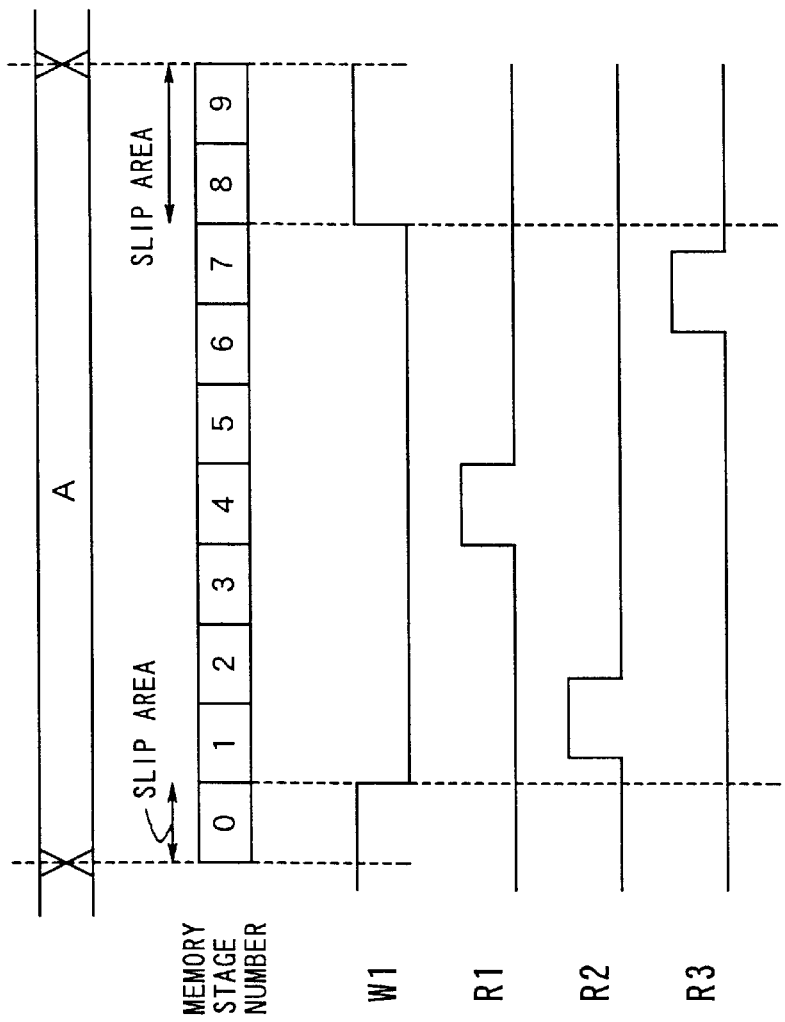
FIG. 11 is a diagram illustrating the problem of the conventional clock resynchronization control.

The signal resynchronization control method of this invention will now be discussed. FIG. 9 is a flowchart illustrating procedures of the signal resynchronization control method of this invention.

[S1] The input signal is converted to parallel data through serial/parallel conversion.

[S2] When the operational state is unstable, a small window with the narrowed readout guarantee area is set at the optimal position at the time of reading parallel data.

[S3] When the operational state is stable, a large window with the readout guarantee area widened from the optimal position is set.

[S4] Based on the read pulse positioned within the readout guarantee area corresponding to the small window or the large window, parallel data is read out and is subjected to parallel/serial conversion, thus generating serial data. This accomplishes signal resynchronization control.

At the time of generating the small window or the large window, the window should be synchronous with the read pulse. Further, protection stages for monitoring whether or not serial data is produced in a normal period are set, whereby a circuit at the subsequent stage is instructed to perform self-oriented control when the set number of protection stages is not satisfied.

As described above, the signal control apparatus 10, the transmission system and the signal resynchronization control method according to this invention are designed in such a manner as to read parallel data and produce serial data by setting the small window Wa with the narrower readout guarantee area for parallel data when the operational state is unstable and setting the large window Wb with the wider readout guarantee area for parallel data when the operational state is stable. This design can suppress the occurrence of data slipping and can thus improve the reliability significantly.

Further, the ES 100 to which this invention is adapted can be constructed with a smaller circuit scale and can reduce consumed power as compared with the conventional ES that performs a stuffing process to absorb a variation in frequency.

Furthermore, the provision of the output protecting section 16 prevents noise or the like, if generated, from adversely affecting a circuit at the subsequent stage. This can ensure highly reliable transmission control.

Although the foregoing description has been given of the ordinary signal resynchronization control, high-quality network synchronization can be established if this invention is adapted particularly to a clock supplying section and clock receiving section for existing synchronous terminal repeater apparatuses including a SONET/SDH transmission apparatus, a digital switching system and so forth.

In short, the signal control apparatus of this invention is designed in such a manner as to read parallel data and produce serial data by setting a small window with a narrower parallel-data readout guarantee area when the operational state is unstable and setting a large window with a wider parallel-data readout guarantee area when the operational state is stable. This structure can efficiently prevent the occurrence of data slipping and execute high-quality signal resynchronization control.

The transmission system of this invention is designed in such a manner as to read parallel data and produce serial data by setting a small window with a narrower parallel-data readout guarantee area when the operational state is unstable and setting a large window with a wider parallel-data readout guarantee area when the operational state is stable. This transmission system can therefore efficiently prevent the occurrence of data slipping and execute high-quality signal resynchronization control before transmitting signals.

The signal resynchronization control method of this invention is designed in such a way as to read parallel data and produce serial data by setting a small window with a narrower parallel-data readout guarantee area when the operational state is unstable and setting a large window with a wider parallel-data readout guarantee area when the operational state is stable. This method can therefore efficiently prevent the occurrence of data slipping and execute high-quality signal resynchronization control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A signal control apparatus for controlling digital signals, comprising:

serial/parallel converting means for performing serial/parallel conversion on an input signal to yield parallel data;

window setting means for setting a small window having a readout guarantee area narrowed at an optimal position at a time of reading said parallel data when an operational state is unstable, and setting a large window having said readout guarantee area widened from said optimal position when said operational state is stable; and parallel/serial converting means for reading said parallel data based on a read pulse positioned within said readout guarantee area corresponding to said small window or said large window, and performing parallel/serial conversion on said parallel data to yield serial data.

2. The signal control apparatus according to claim 1, wherein said window setting means generates said small window and said large window synchronous with said read pulse.

3. The signal control apparatus according to claim 1, further comprising output protecting means for setting a number of protection stages for monitoring whether or not said serial data is produced in a normal period and instructing a subsequent stage to perform self-oriented control, thereby protecting an output, when said set number of protection stages is not satisfied.

4. A transmission system for transmitting digital signals over a network, comprising:

a plurality of transmission apparatuses each including a signal control apparatus comprising serial/parallel converting means for performing serial/parallel conversion on an input signal to yield parallel data, window setting means for setting a small window having a readout guarantee area narrowed at an optimal position at a time of reading said parallel data when an operational state is unstable, and setting a large window having said readout guarantee area widened from said optimal position when said operational state is stable, and parallel/serial converting means for reading said parallel data based on a read pulse positioned within said readout guarantee area corresponding to said small window or said large window, and performing parallel/serial conversion on said parallel data to yield serial data; and a transmission medium for connecting said transmission apparatuses.

5. The transmission system according to claim 4, wherein said window setting means generates said small window and said large window synchronous with said read pulse.

6. The transmission system according to claim 4, further comprising output protecting means for setting a number of protection stages for monitoring whether or not said serial data is produced in a normal period and instructing a subsequent stage to perform self-oriented control, thereby protecting an output, when said set number of protection stages is not satisfied.

7. A signal resynchronization control method for executing signal resynchronization control, comprising the steps of:

performing serial/parallel conversion on an input signal to yield parallel data;

setting a small window having a readout guarantee area narrowed at an optimal position at a time of reading said parallel data when an operational state is unstable;

setting a large window having said readout guarantee area widened from said optimal position when said operational state is stable; and reading said parallel data based on a read pulse positioned within said readout guarantee area corresponding to said small window or said large window, and performing parallel/serial conversion on said parallel data to yield serial data.

8. The signal resynchronization control method according to claim 7, wherein said small window and said large window synchronous with said read pulse are generated.

9. The signal resynchronization control method according to claim 7, wherein a number of protection stages is set for monitoring whether or not said serial data is produced in a normal period, and a subsequent stage is instructed to perform self-oriented control, thereby protecting an output, when said set number of protection stages is not satisfied.

10. A signal control apparatus for controlling digital signals, comprising:

a serial/parallel converting section for performing serial/parallel conversion on an input signal to yield parallel data;

a window setting section for setting a small window having a readout guarantee area narrowed at an optimal position at a time of reading said parallel data when an operational state is unstable, and setting a large window having said readout guarantee area widened from said optimal position when said operational state is stable; and a parallel/serial converting section for reading said parallel data based on a read pulse positioned within said readout guarantee area corresponding to said small window or said large window, and performing parallel/serial conversion on said parallel data to yield serial data.

11. The signal control apparatus according to claim 10, wherein said window setting section generates said small window and said large window synchronous with said read pulse.

12. The signal control apparatus according to claim 10, further comprising an output protecting section for setting a number of protection stages for monitoring whether or not said serial data is produced in a normal period and instructing a subsequent stage to perform self-oriented control, thereby protecting an output, when said set number of protection stages is not satisfied.

13. A transmission system for transmitting digital signals over a network, comprising:

a plurality of transmission apparatuses each including a signal control apparatus comprising a serial/parallel converting section for performing serial/parallel conversion on an input signal to yield parallel data, a window setting section for setting a small window having a readout guarantee area narrowed at an optimal position at a time of reading said parallel data when an operational state is unstable, and setting a large window having said readout guarantee area widened from said optimal position when said operational state is stable, and a parallel/serial converting section for reading said parallel data based on a read pulse positioned within said readout guarantee area corresponding to said small window or said large window, and performing parallel/serial conversion on said parallel data to yield serial data; and a transmission medium for connecting said transmission apparatuses.

14. The transmission system according to claim 13, wherein said window setting section generates said small window and said large window synchronous with said read pulse.

15. The transmission system according to claim 13, further comprising an output protecting section for setting a number of protection stages for monitoring whether or not said serial data is produced in a normal period and instructing a subsequent stage to perform self-oriented control, thereby protecting an output, when said set number of protection stages is not satisfied.

* * * * *